(12) United States Patent
le Roux

(10) Patent No.: US 8,297,425 B1
(45) Date of Patent: Oct. 30, 2012

(54) MOTORCYCLE CLUTCH HAVING A REDUCED CLUTCH SPRING LOAD

(75) Inventor: Philip S. le Roux, Aliso Viejo, CA (US)

(73) Assignee: Advanced Innovational Machinery Corporation, Huntington Beach, CA (US)

( * ) Notice: Subject to any disclaimer, the term of this patent is extended or adjusted under 35 U.S.C. 154(b) by 704 days.

(21) Appl. No.: 12/363,631

(22) Filed: Jan. 30, 2009

Related U.S. Application Data

(60) Provisional application No. 61/025,706, filed on Feb. 1, 2008.

(51) Int. Cl.
*F16D 43/04* (2006.01)

(52) U.S. Cl. .................. 192/83; 192/89.26; 192/105 C; 192/109 R

(58) Field of Classification Search .......................... None
See application file for complete search history.

(56) References Cited

U.S. PATENT DOCUMENTS

| | | | | |
|---|---|---|---|---|
| 2,126,120 A * | 8/1938 | Lewis | ........................ | 192/105 C |
| 2,253,294 A * | 8/1941 | Higgs | ........................ | 192/105 C |
| 2,748,913 A * | 6/1956 | Binder et al. | ............. | 192/105 C |
| 2,846,040 A * | 8/1958 | Binder et al. | ............. | 192/105 C |
| 2,926,765 A * | 3/1960 | Heid | ........................ | 192/105 C |
| 2,953,228 A * | 9/1960 | Newton | .................... | 192/105 C |
| 7,082,661 B2 * | 8/2006 | Ijames et al. | ................. | 29/401.1 |
| 7,665,592 B2 * | 2/2010 | Fox et al. | .................. | 192/105 C |
| 2006/0231367 A1 * | 10/2006 | Shigematsu | .................... | 192/83 |

* cited by examiner

*Primary Examiner* — Rodney Bonck
(74) *Attorney, Agent, or Firm* — Stout, Uxa, Buyan & Mullins, LLP; Donald E. Stout

(57) ABSTRACT

A motorcycle clutch utilizes a reduced clutch spring load with a corresponding reduction in lever effort by an operator to disengage the clutch. At higher speeds, and hence engine torque, the clutch clamp load increases by means of a centrifugal mechanism, supplementing the clamp load provided by the clutch springs, until a predetermined speed level is reached, at which point the centrifugal load is limited, and remains almost constant at all engine speed levels above the predetermined level.

8 Claims, 3 Drawing Sheets

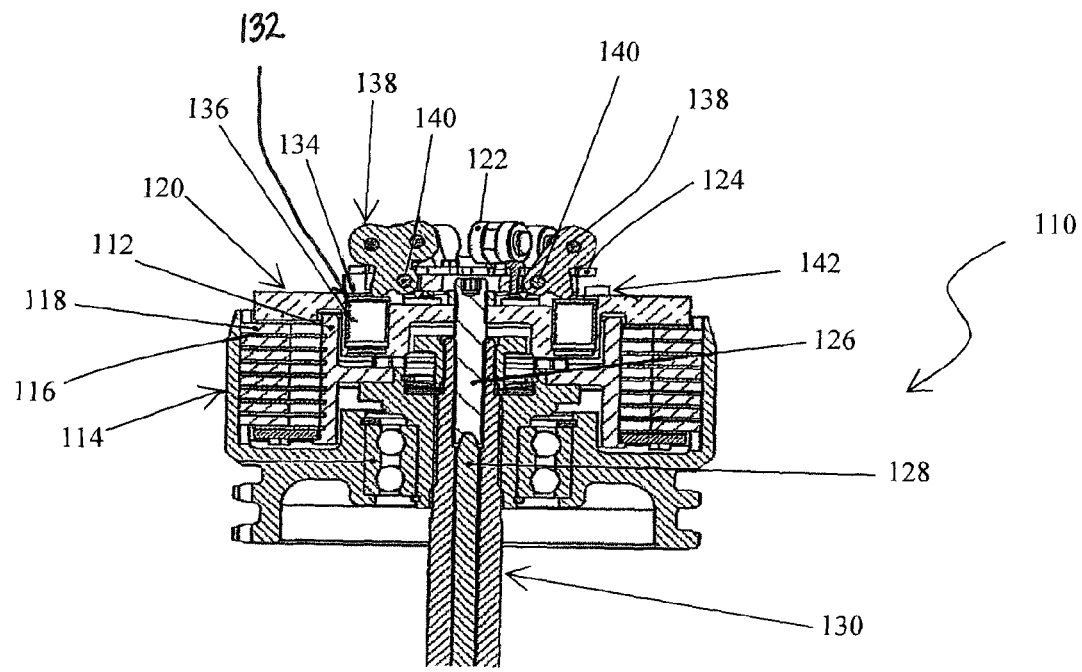
FIG. 3
FIG. 4
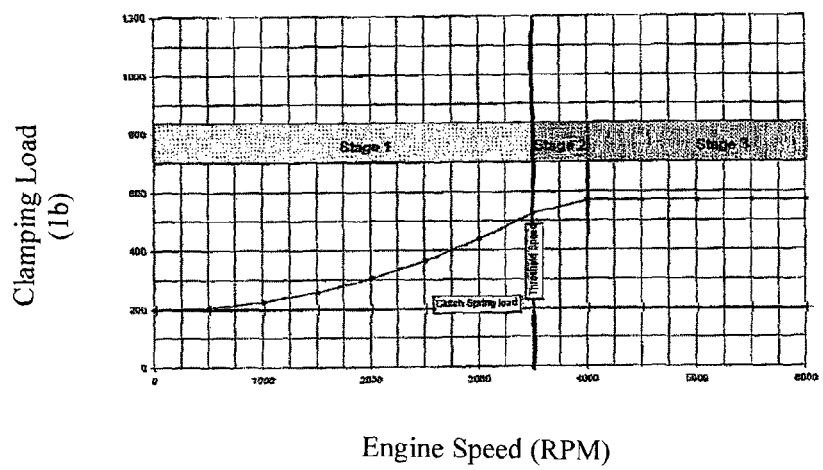
Engine Speed (RPM)

MOTORCYCLE CLUTCH HAVING A REDUCED CLUTCH SPRING LOAD

This application claims the benefit under 35 U.S.C. 119(e) of the filing date of Provisional U.S. Application Ser. No. 61/025,706, entitled Motorcycle Clutch Having a Reduced Clutch Spring Load, filed on Feb. 1, 2008, and expressly incorporated herein by reference, in its entirety.

BACKGROUND OF THE INVENTION

The present invention relates generally to the field of clutches, and more particularly to motorcycle clutches. Motorcycle clutches are normally actuated by a handlebar lever. Current centrifugally assisted clutches utilize increasing clamping loads as engine speed increases, because at higher engine speeds, increased clutch capacity is required, in order to avoid slippage. Thus, higher spring loads are required by the clutch spring in order to clamp the clutch disks. This higher spring load must be overcome by the hand-operated handlebar lever in order to disengage the clutch. Therefore, motorcycle clutches fitted to higher speed motorcycle engines can be extremely difficult to successfully disengage because of the effort required to squeeze the handlebar lever. This causes the motorcycle to be difficult to operate, particularly by persons having limited physical strength. Such difficulty can result in safety issues, as well as reduce operator satisfaction with the vehicle.

SUMMARY OF THE INVENTION

The present invention addresses the foregoing problem by providing a motorcycle clutch which advantageously utilizes a reduced clutch spring load with a corresponding reduction in lever effort. At higher speeds, and hence engine torque, the clutch clamp load increases by means of a centrifugal mechanism, supplementing the clamp load provided by the clutch springs, until a predetermined torque level is reached, at which point the centrifugal load is limited, and remains almost constant at all engine speeds above the predetermined level.

A motorcycle clutch has a drive portion which includes a clutch basket assembly, and a driven portion including a clutch hub. A plurality of drive clutch plates are driven by the clutch basket assembly and a plurality of driven clutch plates are attached to the clutch hub. A pressure plate is coupled for rotation with the driven hub portion and is capable of axial movement from at least a first position to a second position. A clutch spring bears on the pressure plate to effect a clamping load on the clutch plates. A plurality of weighted levers are arranged to pivot on shafts attached to the clutch hub and bearing on sprung elements on the pressure plate. Rotation of the clutch hub results in the movement of the levers to depress the sprung elements until the lever movement is restrained by a lever stop.

More particularly, there is disclosed in particular embodiments of the invention a motorcycle clutch for reducing clutch clamping load at higher engine speeds. The clutch comprises a clutch-driven member, or hub, a clutch-drive member, or basket, and clutch plates disposed within the clutch-drive member. Additional components of the clutch include a pressure plate, and clutch springs for biasing the pressure plate into engagement with the clutch plates, to thereby engage the clutch-drive member and the clutch-driven member. A clutch-actuating member for disengaging the pressure plate from the clutch plates, to thereby disengage the clutch-drive member and the clutch-driven member, is also provided. A captive spring is disposed in the pressure plate, and one or more levers are pivotally mounted on the pressure plate. A retaining plate is also present, for the purpose of limiting the pivot travel of the lever. In operation, at a first engine speed, the lever begins to pivot as a result of applied centrifugal forces and at a second higher engine speed, the lever exerts forces on the captive spring which exceed its preload force, thereby depressing the captive spring until a portion of the lever contacts the retaining plate.

In presently preferred embodiments, the inventive clutch further comprises a piston disposed in the pressure plate, with the captive spring being arranged to pre-load the piston; wherein the lever contacts and depresses the piston against the force applied on the piston by the captive spring, as it pivots responsive to increasing engine speed. Configurable weights are disposed in proximity to the lever and adapted to move radially outwardly responsive to engine speed. An end stop is affixed to the pressure plate for constraining the piston. In operation, clamp loading on the pressure plate when the engine is operating at or below the first engine speed level is the sum of the load applied by the clutch springs and the levers. When the engine is operating at the second engine speed level, clamp loading on the pressure plate is the sum of the load applied by the clutch springs and the constrained spring load of the captive spring. When the engine is operating above the second engine speed level, clamp loading on the pressure plate is the sum of the load applied by the clutch springs and the depressed spring load of the captive spring.

In another aspect of the invention, there is provided a motorcycle clutch modification kit, for modifying an existing motorcycle clutch so that clamping load exerted on a pressure plate of the clutch is maximized at a predetermined engine rotational speed. The kit comprises a pressure plate having a captive spring installed therein, and one or more levers adapted to be pivotally installed on the clutch, so that the levers are engageable with the captive spring when it pivots responsive to centrifugal forces applied thereto responsive to increasing engine speed. The kit further comprises a retaining plate for limiting the travel of the levers as the pivot. In presently preferred embodiments a piston is disposed in the pressure plate. In these embodiments, the captive spring is arranged to pre-load the piston, wherein when the kit is installed in an existing clutch, the one or more provided levers contact and depress the piston against the force applied on the piston by the captive spring, as it pivots responsive to increasing engine speed. An end stop is affixed to the pressure plate for constraining the piston.

In still another aspect of the invention, there is disclosed a method of modifying a motorcycle clutch in order to limit the force required to disengage the motorcycle clutch above a predetermined engine speed, wherein the motorcycle clutch includes a pressure plate for applying pressure to clutch plates in the clutch to engage the clutch, an actuator for moving the pressure plate to relieve the clutch plates in order to disengage the clutch, and clutch springs for biasing the pressure plate and the clutch plates into engagement with one another. The inventive method comprises a step of replacing the existing pressure plate with a pressure plate having a captive spring installed therein and at least one pivotally mounted lever for applying pressure to the captive spring when the engine speed exceeds a predetermined threshold level. Preferably, the pressure plate installed in the motorcycle clutch during the replacing step further comprises a piston which is preloaded by the captive spring, the at least one lever being arranged to apply pressure to the piston.

BRIEF DESCRIPTION OF THE DRAWINGS

FIG. 3 is a cross-sectional view similar to FIG. 2, wherein the levers are shown in Stage 3 lever position;

FIG. 4 is a graph illustrating the pressure plate clamping load vs. rotational speed for a motorcycle clutch of the type illustrated which incorporates the innovative features of the present invention.

DESCRIPTION OF THE PREFERRED EMBODIMENT

Figure 1:
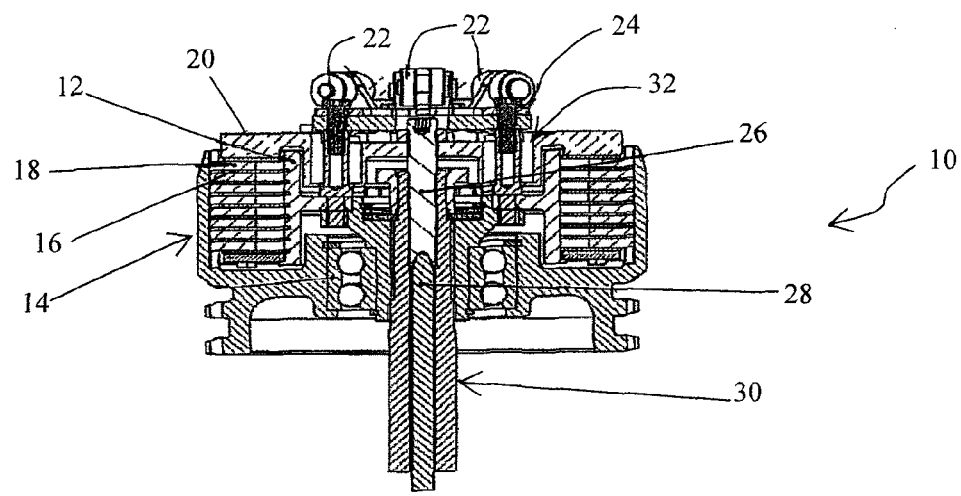
FIG. 1 is a cross-sectional view of a prior art motorcycle clutch of the general type addressed by the invention.

Referring now more particularly to the drawings, there is shown in FIG. 1 a motorcycle clutch 10 of the type addressed by the present invention. The clutch 10 comprises a clutch-driven member or hub 12, and a clutch drive member or basket 14. Disposed within the basket 14 are clutch plates 16 and 18. Other components of the clutch 10 include a pressure plate 20 and configurable attached weights 22, which comprise a centrifugal mechanism to supplement the clamping load provided by the clutch springs at higher engine speed. The clutch 10 further comprises a retaining plate 24, an adjusting screw 26, a clutch actuating rod 28, an output shaft 30, and clutch springs 32.

The typical motorcycle clutch 10 of FIG. 1 is actuated by a hand lever (not shown) on the handlebar of the motorcycle. This actuation moves the clutch actuating rod 28 upwardly so that it bears against the adjusting screw 26. The adjusting screw 26, in turn, moves the pressure plate 20 to relieve the clutch plates 16, 18 from frictional engagement. This allows disengagement of the drive between the clutch drive member or basket 14 and the clutch-driven member or hub 12. When the hand lever is released, the clutch actuating rod 28 moves downwardly away from the pressure plate 20, and clutch springs 32 clamp the pressure plate 20 against the driven clutch plates 16 and the drive clutch plates 18. Torque is thus transmitted from the basket 14 to the hub 12. The hub 12 is connected to the output shaft 30.

As noted above, the problem in prior art clutches of this type is that, as the engine torque increases because of increased power application, the force necessary to move the pressure plate 20 sufficiently to relieve the clutch plates 16, 18 from frictional engagement becomes greater and greater because of centrifugal forces applied by the spinning weights 22. Above about 4000 RPM, the lever force required to disengage the clutch in a normal lock-up style clutch of this type becomes excessive.

Figure 2:
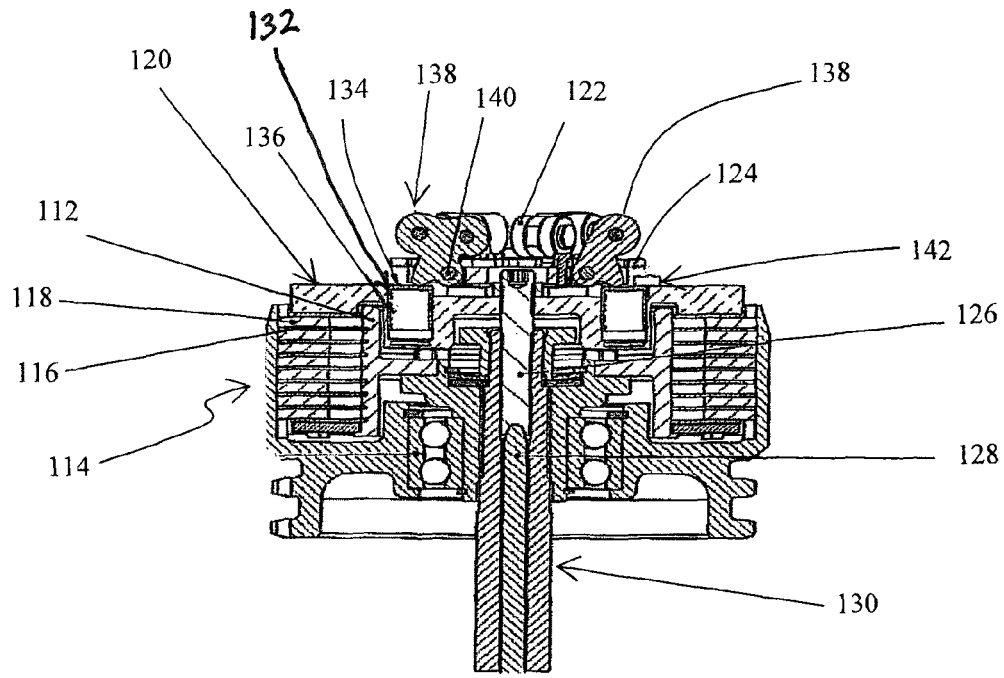
FIG. 2 is a cross-sectional view similar to FIG. 1, illustrating a motorcycle clutch incorporating the innovative features of the present invention, showing the inventive levers in Stage 1 and 2 lever position.
Figure 5:
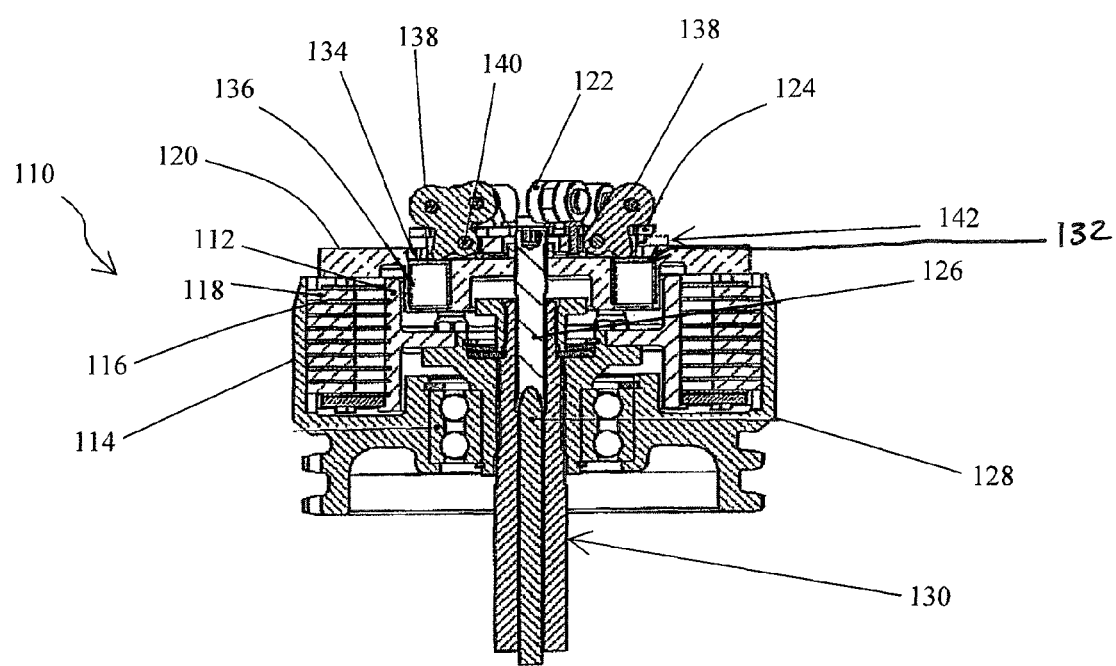
FIG. 5 is a cross-sectional view similar to FIGS. 2 and 3, wherein the clutch has been disengaged at high rotational speed.

To combat this problem, the inventive clutch 110 illustrated in FIGS. 2, 3, and 5 includes some innovative features. In this embodiment all elements equivalent to those illustrated in FIG. 1 are denoted by like reference numerals, preceded by the numeral 1. The innovative features include a piston 134, which may be optional in some embodiments, and a captive spring 136, installed in the pressure plate 120, as well as levers 138.

With respect to the clutch 110, as modified by the above noted inventive features, rotation of the clutch assembly about the output shaft 130 causes the levers 138 and configurable attached weights 122 to move radially outwardly, pivoting on a pivot shaft 140, and bearing on the piston 134. The piston 134 is preloaded by the spring 136, and constrained by an end stop 142. The end stop 142 is fixed to the pressure plate 120. FIG. 2 shows a state wherein the engine is operating at a speed below a predetermined rotational speed.

With continued reference to FIG. 2, in particular, at a predetermined rotational speed, the force exerted by the lever 138 on the top of its corresponding piston 134 equals the force exerted by the piston spring 136 on the underside of the piston 134.

Now with reference to FIG. 3, advantageously, as the rotational speed is increased above this predetermined level, the lever 138 depresses the spring 136 downwardly, against the counter-force of the spring 136, until the lever 138 touches the retaining plate 124 and further lever travel is prevented. At this juncture, further increases in rotational speed result in no increase in clamping load on the pressure plate 120. The rotational speed at which constant clamp load is achieved is adjustable by altering the mass of the weights 122, and the preload force of the spring 136. Hence, higher centrifugal assistance can be used than in a conventional centrifugal-assisted clutch without resulting in overly high operator disengagement effort at higher rotational speeds. Another advantage of the present invention is that the new components are sufficiently compact that the clutch 110 fits, without modification, in the original vehicle.

To summarize, stage 1 of clutch operation, illustrated in FIG. 2, is when the engine rotational speed is below a predetermined threshold level, wherein clamp load on the pressure plate 120 is the sum of lever load and clutch springs. Stage 2 of clutch operation, also illustrated in FIG. 2, is when the engine rotational speed is equal to the predetermined threshold speed, the clamp load on the pressure plate 120 is the sum of the constrained spring load and the clutch springs. Stage 3 of clutch operation, illustrated in FIG. 3, is when engine rotational speed is above the predetermined threshold speed, and the clamp load on the pressure plate 120 is the sum of the depressed spring load and the clutch springs.

In FIG. 4 there is illustrated a graph which represents on the Y axis the clamping load on the pressure plate in pounds (lb), and on the X axis the engine speed in Revolutions per Minute (RPM). As is seen in the graph, the lower line, which remains at a constant 200 lb. regardless of engine speed, represents the clutch spring load. The darker vertical line represents the predetermined threshold speed, which is 3500 RPM on the graph. The remaining line represents the pressure plate clamping load vs. engine speed, for a particular embodiment. As can be seen, at approximately 500 RPM, the pressure plate clamping load is approximately equal to the clutch spring load (200 lb). As the engine speed increases to the threshold speed, the pressure plate clamping load increases fairly linearly to a level of approximately 525 lb. Between the threshold speed of 3500 RPM and about 4000 RPM, which is the span of time during which the levers 138 are pushing the pistons 134 down to the retaining plate 124, the pressure plate clamping load continues to increase, at a lesser rate, to about 575 lb. Then, as the engine speed continues to increase above 4000 RPM, this load of approximately 575 lb continues at a substantially constant level.

FIG. 5 illustrates the inventive embodiment, wherein the clutch is disengaged at a high rotational speed. Thus, because of the high rotational speed, in excess of the threshold speed, the levers 138 are in the full travel position, constrained by the retaining plate 124. Hand lever operation causes the clutch actuating rod 128 to bear against the adjusting screw 126, which in turn moves the pressure plate 120 to relieve the clutch plates 116 and 118 from frictional engagement. This causes further compression of the springs 136 under each piston 134. Hence, clutch disengagement does not necessitate movement of the levers 138 to allow pressure plate movement.

Thus, the present invention advantageously provides the ability to transmit high torque, while remaining easy to disengage at low rotational speeds. The majority of longer period clutch disengagement occurs at lower speed while the vehicle is at rest or moving slowly. The problem of excessive clutch lever effort at high vehicle speeds is dramatically solved.

The improvements described herein are adaptable to kit form, so that they can be installed on an existing clutch, if desired.

Modifications to the illustrated embodiments, described above, may be incorporated while remaining within the spirit of the inventive concept. For example, captive springs in which the levers bear directly on the spring element, alternative piston arrangements, including hydraulic fluid-driven pistons, or captive springs of various types, could be employed. Although an exemplary threshold engine speed is illustrated, the choice of threshold speed is that of the designer, and does not impact the essential inventiveness of the concept. If the captive or "energized" spring is a leaf for Belleville type spring, the piston may be eliminated, with the lever bearing directly on the spring itself in such an embodiment.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention, which is to be limited only in accordance with the following claims.

What is claimed is:

1. A motorcycle clutch for reducing clutch spring load at higher engine speed levels, said clutch comprising:
    a clutch-driven member;
    a clutch-drive member;
    clutch plates disposed within said clutch-drive member;
    a pressure plate;
    a clutch spring for biasing said pressure plate into engagement with said clutch plates, to thereby engage said clutch-drive member and said clutch-driven member;
    a clutch-actuating member for disengaging said pressure plate from said clutch plates, to thereby disengage the clutch-drive member and the clutch-driven member;
    a captive spring disposed in said pressure plate;
    a lever pivotally mounted on said pressure plate; and
    a retaining plate;
    wherein at a first engine speed level, the lever begins to pivot as a result of applied centrifugal forces and at a second higher engine speed level, the lever exerts forces on said captive spring which exceed its spring preload force, thereby depressing the captive spring until a portion of the lever contacts said retaining plate.

2. The motorcycle clutch as recited in claim 1, and further comprising a piston disposed in said pressure plate, said captive spring being arranged to pre-load said piston; wherein said lever contacts and depresses said piston against the force applied on the piston by the captive spring, as it pivots responsive to increasing engine speed.

3. The motorcycle clutch as recited in claim 2, and further comprising an end stop affixed to the pressure plate for constraining said piston.

4. The motorcycle clutch as recited in claim 1, and further comprising configurable weights disposed in proximity to said lever and adapted to move radially outwardly responsive to engine speed.

5. The motorcycle clutch as recited in claim 1, wherein the clutch comprises a plurality of said levers and a plurality of said clutch springs.

6. The motorcycle clutch as recited in claim 5, wherein clamp loading on the pressure plate when the engine is operating at or below said first engine speed level is the sum of a load applied by the clutch springs and the levers.

7. The motorcycle clutch as recited in claim 5, wherein clamp loading on the pressure plate when the engine is operating at said second engine speed level is the sum of a load applied by the clutch springs and a constrained spring load of the captive spring.

8. The motorcycle clutch as recited in claim 5, wherein clamp loading on the pressure plate when the engine is operating above said second engine speed level is the sum of a load applied by the clutch springs and a depressed spring load of the captive spring.

* * * * *